United States Patent
Kim et al.

(10) Patent No.: US 10,047,467 B2
(45) Date of Patent: Aug. 14, 2018

(54) WASHING MACHINE DRIVING APPARATUS AND WASHING MACHINE COMPRISING SAME

(71) Applicant: AMOTECH CO., LTD., Incheon (KR)

(72) Inventors: Byung Soo Kim, Anyang-si (KR); Jong Ha Shin, Seoul (KR)

(73) Assignee: AMOTECH CO., LTD., Incheon (KR)

( * ) Notice: Subject to any disclaimer, the term of this patent is extended or adjusted under 35 U.S.C. 154(b) by 419 days.

(21) Appl. No.: 14/721,185

(22) Filed: May 26, 2015

(65) Prior Publication Data
US 2015/0252507 A1    Sep. 10, 2015

Related U.S. Application Data

(62) Division of application No. PCT/KR2013/011814, filed on Dec. 18, 2013.

(30) Foreign Application Priority Data

Dec. 18, 2012 (KR) .................. 10-2012-0148561
Dec. 18, 2012 (KR) .................. 10-2012-0148562
(Continued)

(51) Int. Cl.
*D06F 37/30* (2006.01)
*D06F 17/08* (2006.01)
(Continued)

(52) U.S. Cl.
CPC ............ *D06F 17/08* (2013.01); *D06F 37/304* (2013.01); *H02K 1/148* (2013.01);
(Continued)

(58) Field of Classification Search
CPC ...... D06F 37/304; D06F 37/40; D06F 37/206; H02K 1/148; H02K 7/14
(Continued)

(56) References Cited

U.S. PATENT DOCUMENTS 5,586,455 A † 12/1996 Imai
6,176,108 B1 † 1/2001 Bae
(Continued)

FOREIGN PATENT DOCUMENTS

JP     11-276777 A  † 10/1999
JP     2002000991      1/2002
(Continued)

OTHER PUBLICATIONS

International Search Report—PCT/KR2013/011814 dated Apr. 18, 2014.

*Primary Examiner* — David G Cormier
*Assistant Examiner* — Thomas Bucci
(74) *Attorney, Agent, or Firm* — Cantor Colburn LLP

(57) ABSTRACT

A washing machine driving apparatus includes: an outer shaft which is connected with a washing tub; an inner shaft rotatably arranged inside the outer shaft and connected with a pulsator; an inner rotor connected with the outer shaft; an outer rotor connected to the inner shaft; and a stator which is disposed with an air gap between the inner rotor and the outer rotor, wherein the outer shaft has one end the washing tub and the other end connected to the inner rotor and is directly connected between the washing tub and the inner rotor, and wherein the inner shaft has one end connected to the pulsator and the other end connected to the outer rotor and is directly connected between the pulsator and the outer rotor.

8 Claims, 14 Drawing Sheets

(30) Foreign Application Priority Data

| Dec. 18, 2012 | (KR) | ......................... 10-2012-0148563 |
| Apr. 26, 2013 | (KR) | ......................... 10-2013-0046666 |
| Apr. 26, 2013 | (KR) | ......................... 10-2013-0046667 |
| Apr. 26, 2013 | (KR) | ......................... 10-2013-0046668 |

(51) Int. Cl.
*H02K 16/02* (2006.01)
*H02K 1/14* (2006.01)
*H02K 15/04* (2006.01)
*D06F 23/04* (2006.01)
*D06F 37/40* (2006.01)

(52) U.S. Cl.
CPC ......... *H02K 15/0442* (2013.01); *H02K 16/02* (2013.01); *D06F 23/04* (2013.01); *D06F 37/30* (2013.01); *D06F 37/40* (2013.01)

(58) Field of Classification Search
USPC .... 68/140, 23.7, 133, 24, 12.24, 3 R, 12.16, 68/12.02, 23 R, 23.6, 23.3; 310/43, 114, 310/71, 67 R, 91, 266, 156.12, 156.26, 310/51, 90, 112, 156.01
See application file for complete search history.

(56) References Cited

U.S. PATENT DOCUMENTS

| 6,257,027 | B1* | 7/2001 | Imai | D06F 37/304 68/12.12 |
| 2003/0177794 | A1* | 9/2003 | Yoon | D06F 37/40 68/12.01 |
| 2006/0042022 | A1* | 3/2006 | Kim | D06F 37/304 8/159 |
| 2007/0205682 | A1* | 9/2007 | Choi | D06F 37/304 310/114 |
| 2009/0064727 | A1* | 3/2009 | Choi | D06F 37/206 68/140 |
| 2010/0058817 | A1* | 3/2010 | Yoshikawa | D06F 37/304 68/139 |

FOREIGN PATENT DOCUMENTS

| JP | 2006-043153 A | † | 2/2006 |
| JP | 2006-068504 A | † | 3/2006 |
| KR | 1020060005647 | | 1/2006 |
| KR | 1020080092023 | | 10/2008 |
| KR | 1020110139434 | | 12/2011 |
| KR | 1020110139675 | | 12/2011 |
| WO | 2012169774 | | 12/2012 |

\* cited by examiner
† cited by third party

WASHING MACHINE DRIVING APPARATUS AND WASHING MACHINE COMPRISING SAME

CROSS REFERENCE TO RELATED APPLICATIONS

This application is a divisional of International Application No. PCT/KR2013/011814, filed on Dec. 18, 2013, which claims priority to and the benefit of Korean Application Nos. 10-2012-0148561 filed on Dec. 18, 2012; 10-2012-0148562 filed on Dec. 18, 2012; 10-2012-0148563 filed on Dec. 18, 2012; 10-2013-0046666 filed on Apr. 26, 2013; 10-2013-0046667 filed on Apr. 26, 2013; and 10-2013-0046668 filed on Apr. 26, 2013, in the Korean Patent Office, the entire contents of which are incorporated herein by reference.

TECHNICAL FIELD

The present invention relates to a washing machine driving apparatus and a washing machine comprising same in which a washing tub and a pulsator are directly connected to the washing machine driving apparatus, to thus drive the washing tub and the pulsator, respectively, without having a separate intermediate mediator.

BACKGROUND ART

As disclosed in Korean Patent Registration Publication No. 10-0548310 (Jan. 24, 2006), the conventional washing machine includes: an outer case forming an outer shape; an outer tub which is supported on an inside of the outer case for receiving wash water therein; an inner tub which is rotatably accommodated in an inside of the outer tub and is used for both washing and dehydrating; a pulsator which is mounted in an inside of the inner tub relatively rotatably, to form a washing water flow; a drive motor for generating a driving force for rotating the inner tub and the pulsator; an inner tub rotating shaft which receives the driving force of the drive motor for rotating the inner tub; a pulsator rotating shaft which receives the driving force of the drive motor for rotating the pulsator; a sun gear which is connected to the drive motor and is connected to the pulsator rotating shaft; a plurality of planetary gears which are simultaneously engaged with the sun gear and a ring gear; a carrier supporting the planetary gears so as to be rotated and revolved; and a clutch for controlling the rotation of the inner tub and the pulsator during washing or dehydrating.

The conventional washing machine has a planetary gear unit including the sun gear, the ring gear, the planetary gears and the carrier, and reduces the rotating force of the drive motor, to then be transferred to the pulsator and the inner tub, and operates a clutch spring to selectively transmit power to the pulsator and the inner tub, to thus rotate only the pulsator or both the pulsator and the inner tub simultaneously.

However, the conventional washing machine needs the planetary gear unit and the clutch in order to selectively rotate the pulsator and the inner tub, to accordingly cause the configuration of the conventional washing machine to be complicated and the production cost thereof to increase.

Further, since the conventional washing machine is configured to have the planetary gear unit and the clutch between the drive motor and the outer tub, the space occupied in the height direction of the washing machine is increased and thus the height of the washing machine increases. Otherwise, since the height of the inner tub should be reduced in an identical height of the washing machine, there is a problem that a washing capacity is reduced.

In addition, since the conventional washing machine enables the pulsator and the inner tub to be rotated in an identical direction, but not to be rotated in opposite directions to each other, there is a problem that the washing machine performance is lowered.

SUMMARY OF THE INVENTION

To solve the above problems or defects, it is an object of the present invention to provide a washing machine driving apparatus and a washing machine comprising the same, to remove an existing clutch, simplify a manufacturing process, and reduce the height of the washing machine.

In addition, it is another object of the present invention to provide a washing machine driving apparatus and a washing machine comprising the same, to enable a pulsator and a washing tub simultaneously in opposite directions to each other, and to improve performance of the washing machine.

In addition, it is still another object of the present invention to provide a washing machine driving apparatus and a washing machine having the same, in which an outer shaft is directly connected between an inner rotor and a pulsator, and an inner shaft is directly connected between an outer rotor and a washing tub, to thus transmit power directly without having a separator intermediate mediator while simplifying the structure to thereby minimize power loss.

In addition, it is yet another object of the present invention to provide a washing machine driving apparatus and a washing machine having the same, in which a stator core is mounted on a bearing housing fixed to an outer tub, to thereby have no need to undergo a separate process for forming a plurality of stator cores in an annular shape to thus reduce the number of parts required and simplify a manufacturing process thereof.

In addition, it is still yet another object of the present invention to provide a washing machine driving apparatus and a washing machine having the same, in which a bearing housing and a stator are integrally formed by insert injection, to thus shorten a manufacturing process therefor and reduce the number of components, and further reduce a manufacturing cost, and perform a waterproof function of the stator.

In addition, it is a further object of the present invention to provide a washing machine driving apparatus and a washing machine having the same, in which an outer rotor and an inner rotor are integrally formed by insert injection, to thus shorten a manufacturing process thereof.

The objects of the present invention are not limited to the above-described objects, and other objects and advantages of the present invention can be appreciated by the following description and will be understood more clearly by embodiments of the present invention.

To accomplish the above and other objects of the present invention, according to an aspect of the present invention, there is provided a washing machine driving apparatus comprising: an outer shaft which is connected with a washing tub; an inner shaft which is rotatably arranged inside the outer shaft and connected with a pulsator; an inner rotor which is connected with the outer shaft; an outer rotor which is connected to the inner shaft; and a stator which is disposed with an air gap between the inner rotor and the outer rotor, wherein the outer shaft has one end the washing tub and the other end connected to the inner rotor and is directly connected between the washing tub and the inner rotor and wherein the inner shaft has one end connected to the pulsator and the other end connected to the outer rotor and is directly connected between the pulsator and the outer rotor.

Preferably but not necessarily, the outer shaft is rotatably supported by a first bearing and a second bearing, in which the first bearing is fixed to a first bearing housing, the second bearing is fixed to a second bearing housing, and the first bearing housing and the second bearing housing are fixed to an outer tub.

Preferably but not necessarily, a first seal is mounted between each of the bearing housings and the outer shaft and a second seal is mounted between the outer shaft and the inner shaft, thereby preventing the leakage of washing water.

Preferably but not necessarily, the outer shaft is formed of a hollow shape, and comprises: a first shaft on an outer circumferential surface of which a first connecting portion connected to an inner rotor housing is formed; and a second shaft which is press-fixed to an upper end of the first shaft and on an outer circumferential surface of which a second connecting portion connected to the washing tub is formed.

Preferably but not necessarily, the first shaft comprises: a press-fit groove into which the second shaft is press-fitted and which is formed on the inside of an upper end of the first shaft; and a stepped portion which is formed on an outer circumferential surface of a lower side of the first shaft, in which the first connecting portion by which the first bearing is supported and to which the inner rotor housing is connected are formed on the stepped portion, and a first fixing nut which secures the inner rotor housing is engaged with the stepped portion.

Preferably but not necessarily, the inner shaft comprises: a third connecting portion which is drawn out from a lower end of the outer shaft and connected to the outer rotor housing, in which the third connecting portion is formed at a lower side of the inner shaft; and a fourth connecting portion which is drawn out from an upper end of the outer shaft and connected to the pulsator, and wherein a second fixing nut which secures the outer rotor housing is engaged with a lower end of the inner shaft.

As described above, a washing machine driving apparatus according to the present invention directly connects between a drive motor and both a pulsator and a washing tub, to thereby remove a clutch and a planetary gear set of an existing power conversion unit, and to thus reduce a manufacturing cost and simplify a manufacturing process, while reducing height of a washing machine but increasing a washing capacity.

In addition, the washing machine driving apparatus according to the present invention is configured to directly connect between a pulsator and an outer rotor, and directly connect between a washing tub and an inner rotor, to thereby rotate the pulsator even if only the outer rotor is driven, or to thereby rotate the washing tub even if only the inner rotor is driven, and is configured to rotate the pulsator and the washing tub in an identical direction or in different directions to thus improve performance of the washing machine.

In addition, the washing machine driving apparatus according to the present invention is configured to make an outer shaft directly connect between an inner rotor and a pulsator, and to make an inner shaft directly connect between an outer rotor and a washing tub, to thus simplify the structure thereof, and to directly transmit power without any intermediate mediator, to thus minimize a power loss and improve performance of a washing machine.

Further, the washing machine driving apparatus according to the present invention is configured to mount a plurality of stator cores on a first bearing housing on which a first bearing fixed to an outer tub and rotatably supporting an outer shaft is mounted, to thereby secure a stator while arranging the stator cores in an annular form with no extra process, to thus have no need of parts for arranging the stator cores in the annular form and a separate stator support for making the stator cores fixed on an outer tub, or the like to thereby reduce the number of parts required and simplify a manufacturing process thereof.

DETAILED DESCRIPTION OF THE INVENTION

Figure 1:
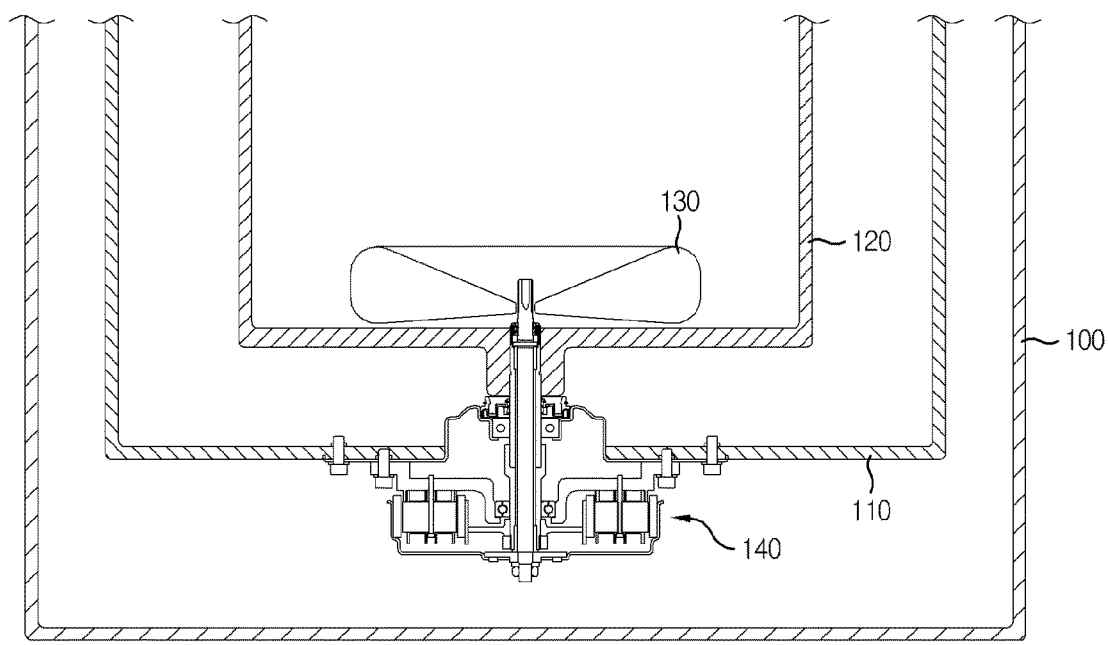
FIG. 1 is a cross-sectional view of a washing machine according to a first embodiment of the present invention.

Hereinafter, embodiments of the present invention will be described in detail with reference to the accompanying drawings. In the process, the size and shape of the components illustrated in the drawings may be shown exaggerated for convenience and clarity of explanation. Further, by considering the configuration and operation of the present invention the specifically defined terms can be changed according to user's or operator's intention, or the custom. Definitions of these terms herein need to be made based on the contents across the whole application.

Figure 2:
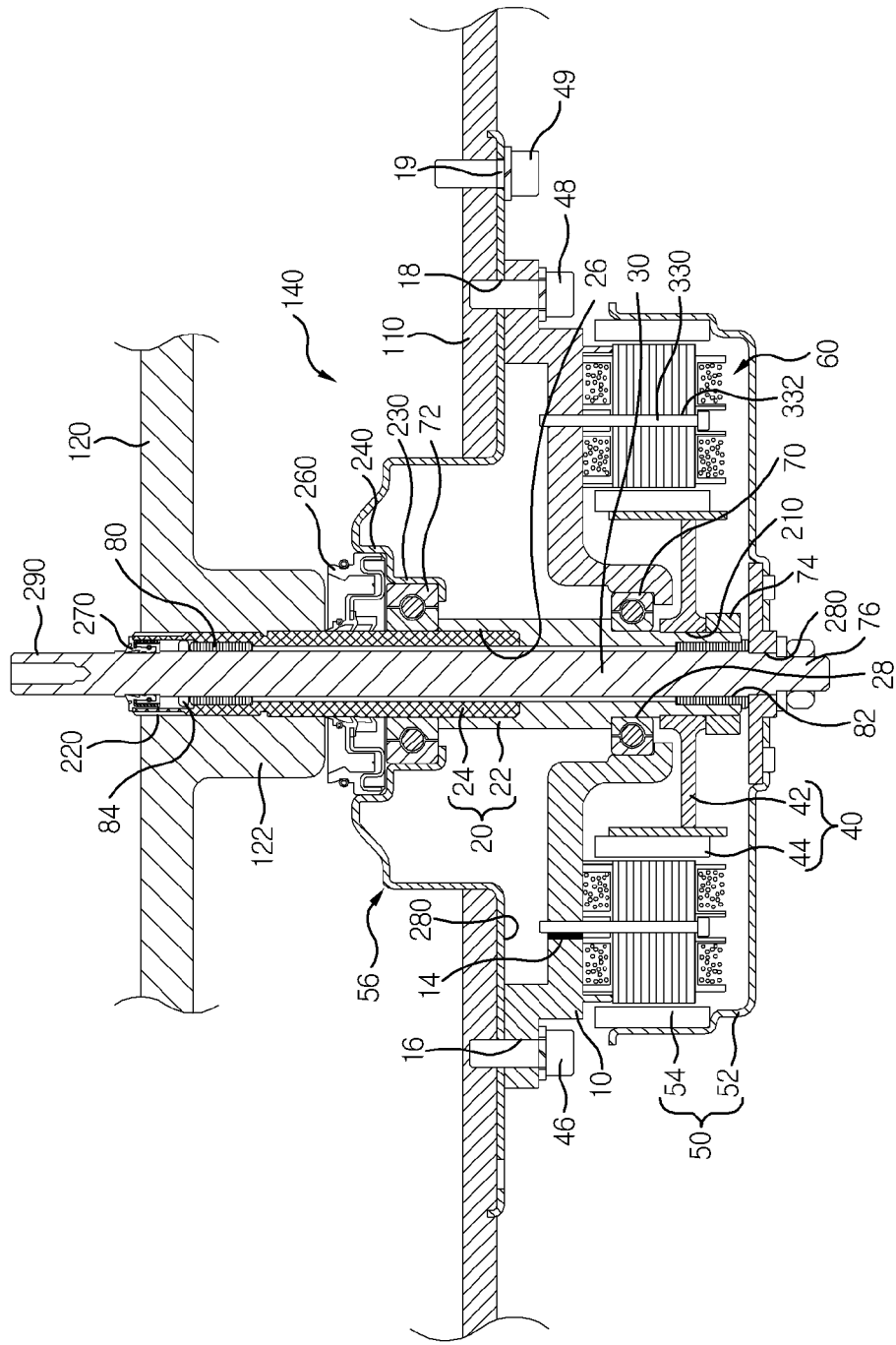
FIG. 2 is a cross-sectional view of a driving apparatus of the washing machine according to the first embodiment of the present invention.

FIG. 1 is a cross-sectional view of a washing machine according to a first embodiment of the present invention, and FIG. 2 is a cross-sectional view of a driving apparatus of the washing machine according to the first embodiment of the present invention.

Referring to FIGS. 1 and 2, the washing machine includes: a case 100 forming an outer appearance; an outer tub 110 which is suspended and supported on an inside of the case 100 for receiving washing water; a washing tub 120 which is rotatably disposed inside the outer tub 110 to perform washing and dehydrating; a pulsator 130 which is rotatably disposed inside the washing tub 120 to form a washing water flow; and a washing machine driving apparatus 140 which is mounted on a lower portion of the washing tub 120, to drive the washing tub 120 and the pulsator 130 simultaneously or selectively.

As shown in FIG. 2, the driving apparatus 140 includes: an outer shaft 20 which is connected with the washing tub 120; an inner shaft 30 which is rotatably arranged inside the outer shaft 20 and connected with a pulsator 130; an inner rotor 40 which is connected with the outer shaft 20; an outer rotor 50 which is connected to the inner shaft 30; and a stator 60 which is disposed with an air gap between the inner rotor 40 and the outer rotor 50.

A first bearing 70 and a second bearing 72 which rotatably support the outer shaft 20 are disposed at a predetermined interval on an outer circumferential surface of the outer shaft 20.

The first bearing 70 is supported on the first bearing housing 10, and the second bearing 72 is supported on the second bearing housing 56. The first bearing housing 10 and the second bearing housing 56 are fixed to the outer tub 110.

Figure 3:
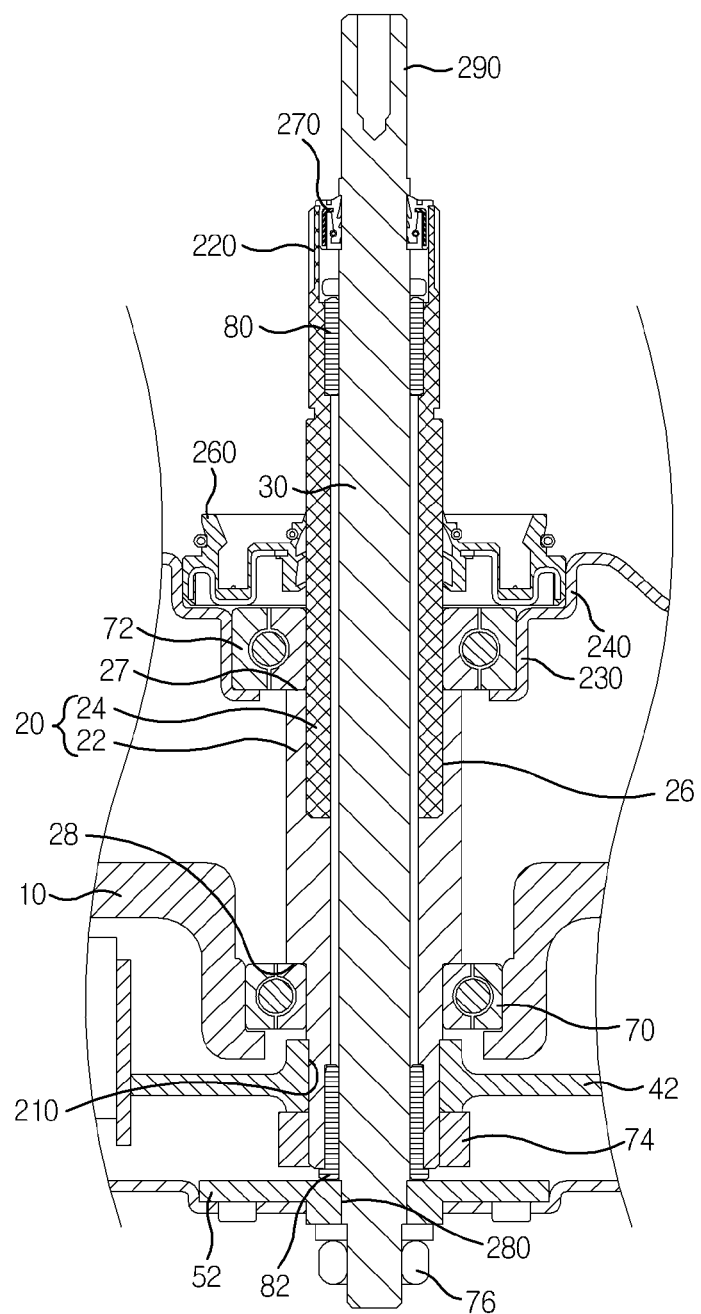
FIG. 3 is a cross-sectional view of an inner shaft and an outer shaft in accordance with the first embodiment of the present invention.

As shown in FIG. 3, the outer shaft 20 is formed in a cylindrical form so that the inner shaft 30 passes through the outer shaft 20, and includes: a first shaft 22 coupled to the inter rotor 40; and a second shaft 24 connected to an upper side of the first shaft 22 and coupled to the washing tub 120.

A press-fit groove 26 into which a lower end of the second shaft 24 is press-fitted is formed on the inside of an upper end of the first shaft 22, and a stepped portion 28 whose outer diameter becomes small is formed on an outer circumferential surface of an intermediate side of the first shaft 22, in which the first bearing 70 is mounted on the stepped portion 28 to thus prevent the first bearing 70 from moving up and down.

In addition, a first connecting portion 210 on which an inner rotor housing 42 of the inner rotor 40 is fixed is formed at a lower side of a portion where the first bearing 70 of the first shaft 22 is mounted, and a first fixing nut 74 which makes the inner rotor housing 42 fixed to the first shaft 22 is fastened at the lower side of the first connecting portion 210.

Here, the first bearing 70 is inserted into the stepped portion 28 formed on the outer circumferential surface of the first shaft 22, the inner rotor housing 42 is connected to the first connecting portion 210, and a first tightening nut 74 is coupled with the first connecting portion 210, to thereby complete an assembly conveniently. In addition, since the first bearing 70 is inserted into the stepped portion 28, the first bearing 70 is prevented from moving and the inner rotor housing 42 is prevented from being separated from the first shaft 22 by the first tightening nut 74.

The lower end of the second shaft 24 is press-fitted into the press-fit groove 26 of the first shaft 22 and is connected to the first shaft 22, the second bearing 72 is inserted into an outer circumferential surface thereof, and a second connecting portion 220 connected to a fixing portion 122 formed at the center of the washing tub 110 is formed on an outer circumferential surface of an upper portion of a portion into which the second bearing 72 is inserted.

The second bearing 72 is engaged with a stepped portion 27 formed on top of the first shaft 22, to thus prevent the second bearing 72 from being seceded from the stepped portion 27.

The first connecting portion 210 and the second connecting portion 220 may be coupled by serration coupling or spline coupling through a protrusion formed on the outer surface of the first shaft 22, or by mutual key coupling through a key groove formed on the outer surface of the first shaft 22.

The first connecting portion 210 and the second connecting portion 220 may be coupled by employing any structure which can connect the inner rotor housing 42 and the washing tub 110, in addition to the above-described coupling methods.

The inner shaft 30 is rotatably disposed on an inner surface of the outer shaft 20, and the lower end of the inner shaft 30 is extended out from the lower end of the outer shaft 20. A third connecting portion 280 to which the outer rotor housing 52 is connected is formed at the lower end of the inner shaft 30. A second tightening nut 76 which prevents the outer rotor housing 52 from seceding from the third connecting portion 280 is coupled on the lower end of the inner shaft 30. Then, the top of the inner shaft 30 is extended from the top of the outer shaft 20 in which a fourth connecting portion 290 to which the pulsator 130 is connected is formed at the upper end of the inner shaft 30.

Here, the third connecting portion 280 and the fourth connecting portion 290 have a structure in which the third connecting portion 280 and the fourth connecting portion 290 may be coupled by serration coupling or spline coupling through protrusions formed on the outer surface of the inner shaft 30, the outer rotor housing 52 and the pulsator 130, or by mutual key coupling through key grooves formed on the outer surface of the inner shaft 30, the outer rotor housing 52 and the pulsator 130.

A first sleeve bearing 80 and a second sleeve bearing 82 are secured on the upper-inner circumferential surface and the lower-inner circumferential surface of the outer shaft 20. The inner shaft 30 is rotatably supported on the first sleeve bearing 80 and the second sleeve bearing 82.

In addition, a secession prevention ring 84 is coupled on the upper-outer circumferential surface of the inner shaft 30 and the secession prevention ring 84 prevents secession of the first sleeve bearing 80.

Figure 4:
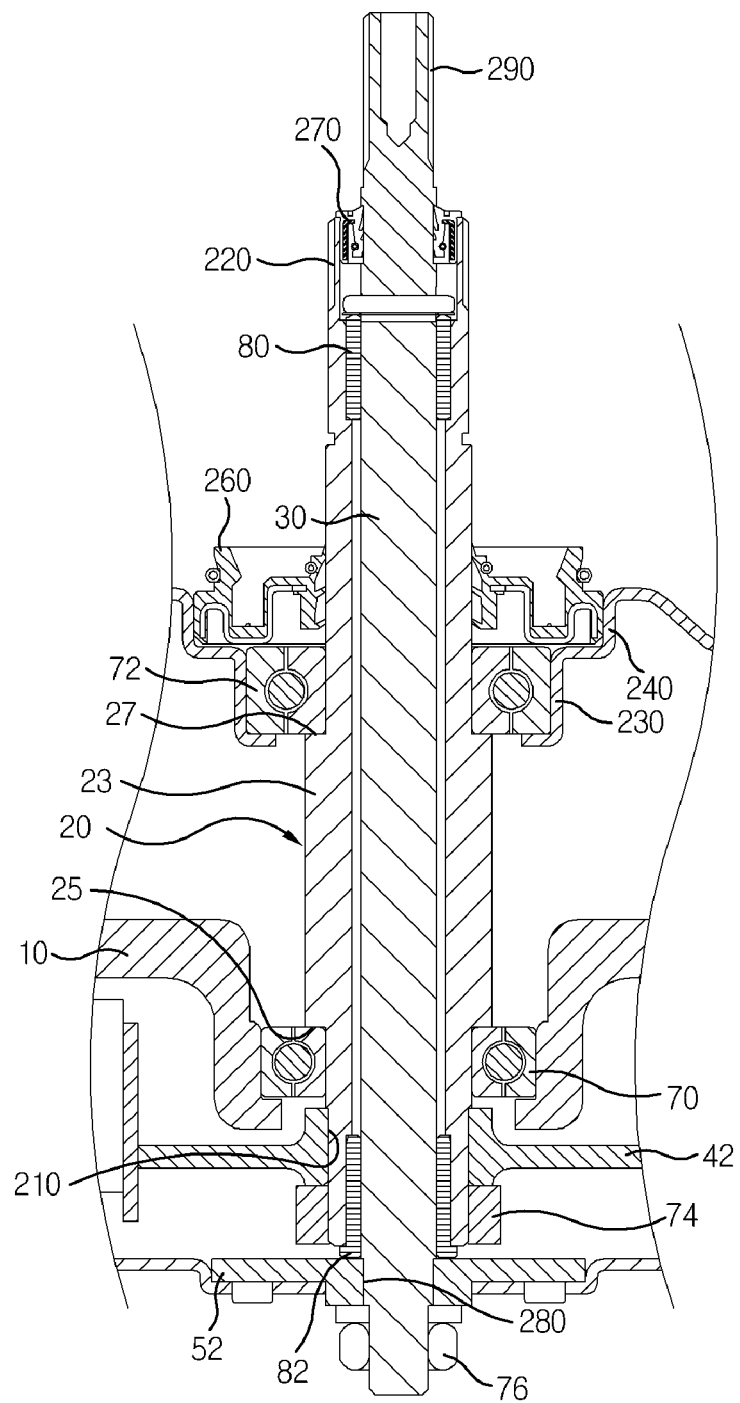
FIG. 4 is a cross-sectional view showing another example of an outer shaft in accordance with the present invention.

FIG. 4 is a cross-sectional view of another example of the outer shaft in accordance with the present invention.

The outer shaft 20 in accordance with another example is a hollow shape so that the inner shaft 30 is rotatably supported therein, the first connecting portion 210 to which the inner rotor housing 42 of the inner rotor 40 is connected is formed on the lower-outer circumferential surface of the outer shaft 20, the second connecting portion 220 to which the washing tub 120 is connected is formed on the upper-outer circumferential surface of the outer shaft 20, and an outer diameter enlarging portion 23 whose outer diameter becomes large is formed at the center side of the outer shaft 20.

In addition, a first stepped portion 25 and a second stepped portion 27 are formed at the bottom and top of the outer diameter enlarging portion 23, respectively. The first bearing 70 is supported on the first stepped portion 25, to prevent the first bearing 70 from moving, and the second bearing 72 is supported on the second stepped portion 27, to prevent the second bearing 72 from moving.

The outer shaft 20 which has been described in the above embodiment has a structure that the outer shaft 20 is separated into the first shaft 22 and the second shaft 24, but the outer shaft 20 in accordance with another embodiment may have an integrated structure formed as one.

Figure 5:
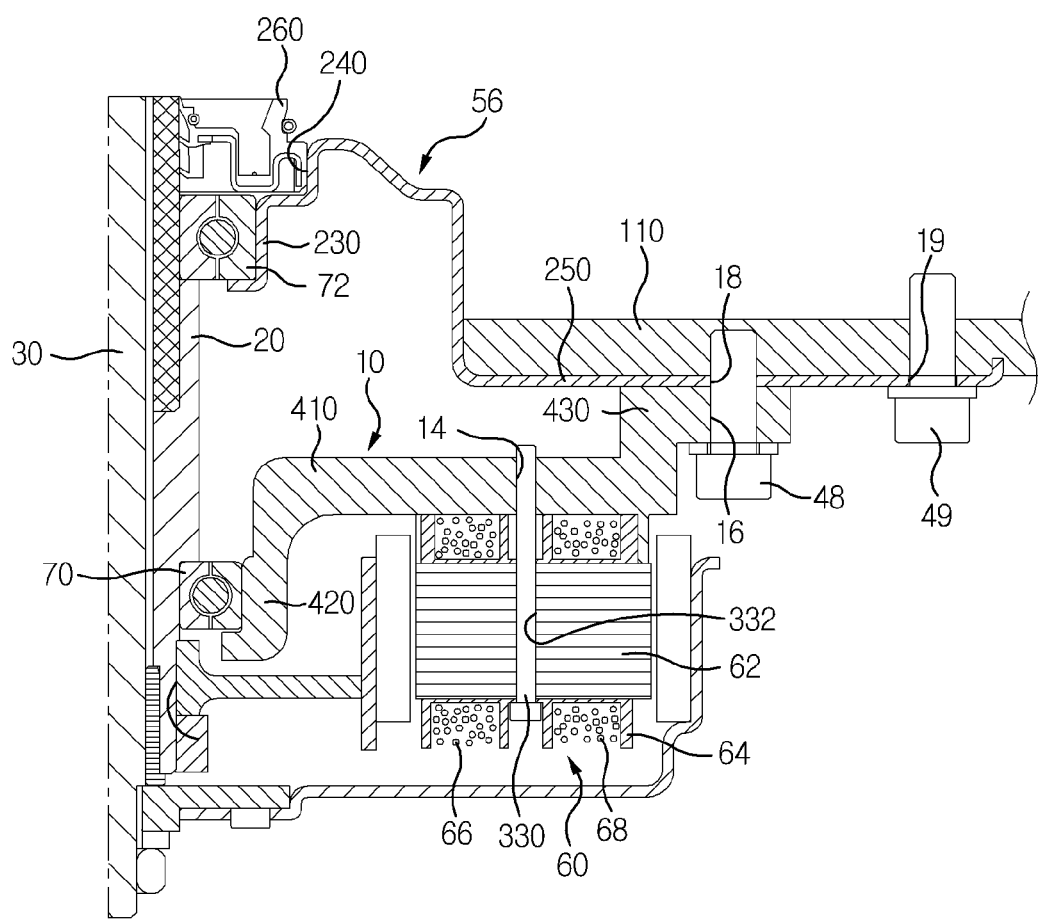
FIG. 5 is a cross-sectional view of half the driving apparatus of the washing machine according to the first embodiment of the present invention.

As shown in FIG. 5, the first bearing housing 10 includes: a disc portion 410 which is made of a resin material and integrally formed by a mold, and is formed of a disc shape; a first bearing mounting portion 420 which is bent in a downward direction from the inner side of the disc portion 410 is bent in which the first bearing 70 is mounted; and an outer tub fixing portion 430 which is bent in an upward direction from the outer side of the disc portion 410 and fixed to an outer tub.

A plurality of first coupling holes 14 are formed in the disc portion 410 in which a plurality of stator cores 62 are coupled with the plurality of first coupling holes 14 with a predetermined interval 14, in the circumferential direction of the disc portion 410, and a plurality of second coupling holes 16 which are coupled on the outer tub 110 with a bolt are formed on the outer tub fixing portion 430.

A second bearing housing 56 is formed of a metal material, and includes: a second bearing mounting portion 230 which is formed at the central opening portion in which the second bearing 72 is mounted; a seal mounting portion 240 which is bent in an upward direction from the second bearing mounting portion 230 in which a first seal 260 is mounted; and an outer tub coupling portion 250 which is bent in a downward direction from the seal mounting portion 240, in which a third coupling hole 18 is formed to be coupled on the outer tub 110 with a bolt 48.

In addition, a fourth coupling hole 19 is further formed to the outside of the third coupling hole 18 of the second bearing housing 56, and the second bearing housing 56 can be secured on the outer tub 110 more firmly so as to be coupled on the outer tub 110 through the fourth coupling hole 19 with a bolt 49.

Here, an opening is formed in the center of the outer tub 110, the second bearing housing 56 passes through the opening of the outer tub 110 and comes in contact with the rear surface of the outer tub 110, and the first bearing housing 10 is stacked on the second bearing housing 56 to then be coupled on the outer tub 110 by the single bolt 48.

In other words, the first bearing housing 10 and the second bearing housing 56 are arranged to be laminated on the rear surface of the outer tub 110, the bolt 48 is passed through the second coupling hole 16 of the first bearing housing 10 and the third coupling hole 18 of the second bearing housing 56, to then be coupled with the outer tub 110. Accordingly, the first bearing housing 10 and the second bearing housing 56 can be coupled with the outer tub 110 with the single bolt 48 simultaneously, to thus improve the assembling property.

The first seal 260 is mounted between the second bearing housing 56 and the outer surface of the outer shaft 20 to prevent the washing water from leaking, and a second seal 270 is mounted between the upper-inner surface of the outer shaft 20 and the upper-outer surface of the inner shaft 30, to prevent the washing water from leaking.

The inner rotor 40 includes: the inner rotor housing 42; and a first magnet 44 fixed on the outer surface of the inner rotor housing 42. The inner rotor housing 42 is formed of a disc shape with a central opening portion, in which the first magnet 44 is fixed on the outer surface of the inner rotor housing 42 and the first connecting portion 210 of the outer shaft 20 is connected to the inner surface of the inner rotor housing 42.

In addition, the outer rotor 50 includes: the outer rotor housing 52 and a second magnet which is fixed on the inner surface of the outer side of the outer rotor housing 52 and is disposed at a predetermined gap facing the outer surface of the stator 60. The second magnet 54 is fixed to the inner surface of the outer side of the outer rotor housing 52 and the inner surface of the outer rotor housing 52 is connected to the third connecting portion 280 of the inner shaft 30.

Here, the inner rotor housing 42 and the rotor outer housing 52 are preferably formed of a magnetic passage forming material for forming a magnetic passage with no back yoke.

Figure 6:
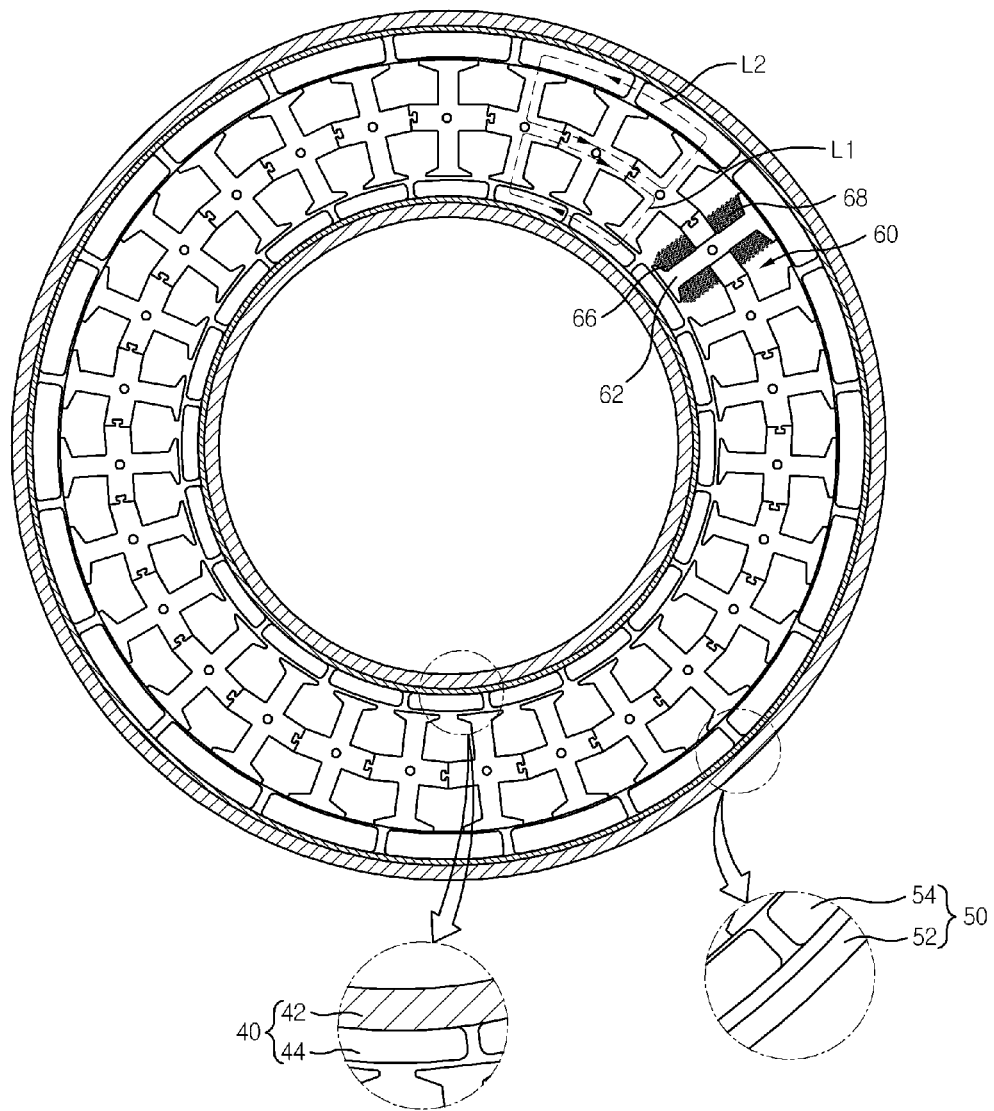
FIG. 6 is a transverse cross-sectional view of a stator according to the first embodiment of the present invention.
Figure 7:
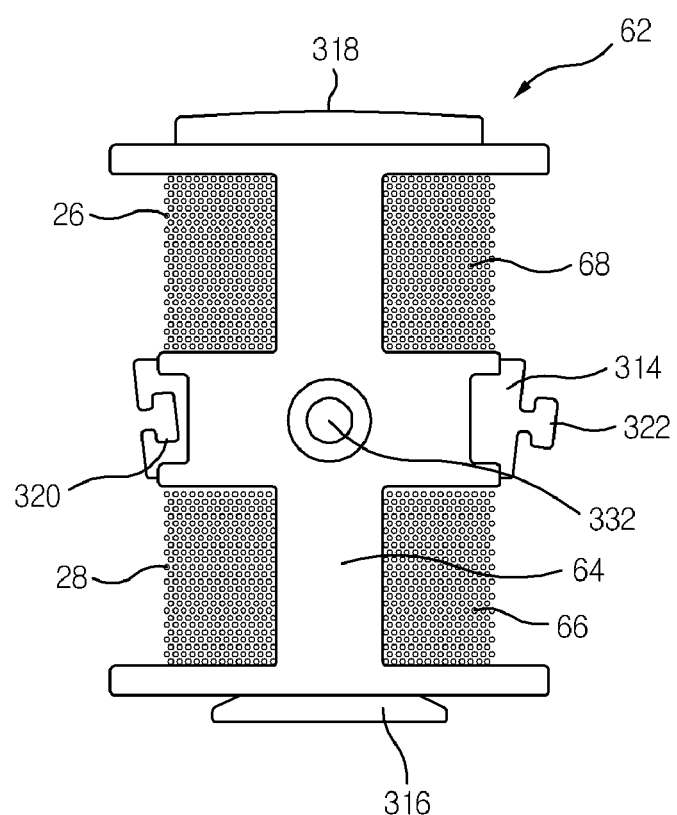
FIG. 7 is a plan view of the stator according to the first embodiment of the present invention.
Figure 8:
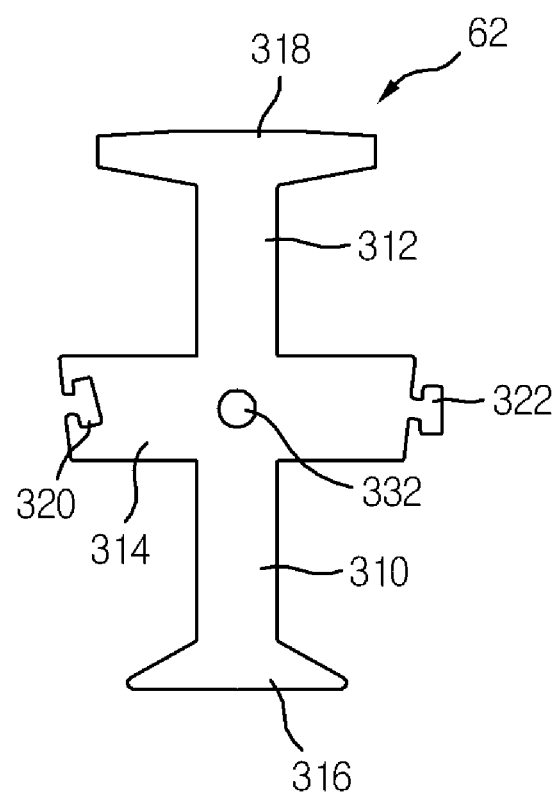
FIG. 8 is a plan view of a stator core according to the first embodiment of the present invention.

FIG. 6 is a transverse cross-sectional view of the stator according to the first embodiment of the present invention, FIG. 7 is a cross-sectional view of a stator core according to the first embodiment of the present invention, and FIG. 8 is a plan view of a stator core according to the first embodiment of the present invention.

The stator 60 includes: a plurality of stator cores 62 which are radially arranged; bobbins 64 made of a non-magnetic material, and surrounded on the outer circumferential surfaces of the stator cores 62; a first coil 66 wound on one side of the stator cores 62; and a second coil 68 wound on the other side of the stator cores 62.

Here, a first power source, that is, a drive signal is applied to the first coil 66, and a second power source, that is, a drive signal is applied to a second coil 68. Thus, when the first power source is applied to only the first coil 66, only the inner rotor 40 is rotated, when the second power source is applied to only the second coil 68, only the outer rotor 50 is rotated, and when the first power source and the second power source are simultaneously applied to the first coil 66 and the second coil 68, respectively, the inner rotor 40 and the outer rotor 50 are rotated simultaneously.

Each of the stator cores 62 includes: a first tooth portion 310 on which the first coil 66 is wound; a second tooth portion 312 which is formed on the other side of the first tooth portion 310 and on which the second coil 68 is wound; a partitioning portion 314 for dividing between the first and second tooth portions 310 and 312; and coupling unit 320 and 322 which are formed at both side ends on the partitioning portion 314 and which mutually connects between the stator cores 62.

A first flange portion 316 which is arranged to face the first magnet 44 is formed at the end of the first tooth portion 310, and a second flange portion 318 which is arranged to face the second magnet 54 is formed at the end of the second tooth portion 312.

The first flange portion 316 and the second flange portion 318 are configured to form inwardly and outwardly curved surfaces at a predetermined curvature to correspond to the first magnet 44 of the inner rotor 40 and the second magnet 54 of the outer rotor 50. Thus, roundness of the inner and outer circumferential surfaces of the stator core 62 increases, and thus the inner and outer circumferential surfaces of the stator are close to the first magnet 44 and the second magnet 54, respectively, but a predetermined magnetic gap may be maintained.

Then, a throughhole 332 through which a fixing bolt 330 passes is formed at the center of the stator core 62, that is, the partitioning section 314.

Here, the fixing bolt 330 passes through the throughhole 332 and is coupled with the first coupling hole 14 formed in the first bearing housing 10, which plays a role of securing the stator core 62 on the first bearing housing 10.

In other words, after having arranged the stator cores 62 in the circumferential direction on the first bearing housing 10, and then having made the fixing bolt 330 pass through the throughhole 332 formed on each of the stator cores 62, so as to be coupled with the first coupling hole 14 formed in the first bearing housing 10, the stator cores 62 can be arranged and fixed in an annular form.

Thus, the stator cores 62 are arranged at a predetermined interval in the circumferential direction on the first bearing housing 10, and then coupled by the fixing bolt 330, to thereby complete the assembly. The first bearing housing 10 is coupled and fixed on the outer tub 110 with the bolt 48 and thus parts and an assembly process of arranging the conventional stator cores in an annular form and parts and an assembly process of fixing the stator are unnecessary, to thus reduce the assembly process and the number of parts.

As described above, a coupling structure between the stator cores 62 and the first bearing housing 10 may be integrally formed by insert molding in addition to the structure which is coupled by the fixing bolt 330.

The stator cores 62 have a structure that the stator cores 62 are directly connected to each other, so as to form a magnetic circuit between the stator cores 62. Thus, the coupling portions 320 and 322 have a structure that the coupling portions 320 and 322 are directly connected between the stator cores 62 so that the stator cores 62 may be energized each other.

As an example, these coupling portions 320 and 322 are configured so that a coupling protrusion 322 is protrudingly formed at one side of the partitioning portion 314 and a coupling groove 320 with which the coupling protrusion 322 is fitted and coupled is formed at the other side of the partitioning portion 314. Thus, when the coupling protrusion 322 is fitted into and coupled with the coupling groove 320, the stator cores 62 are radially arranged, and have a directly cross-linked structure that the stator cores 62 are directly connected with each other.

Figure 9:
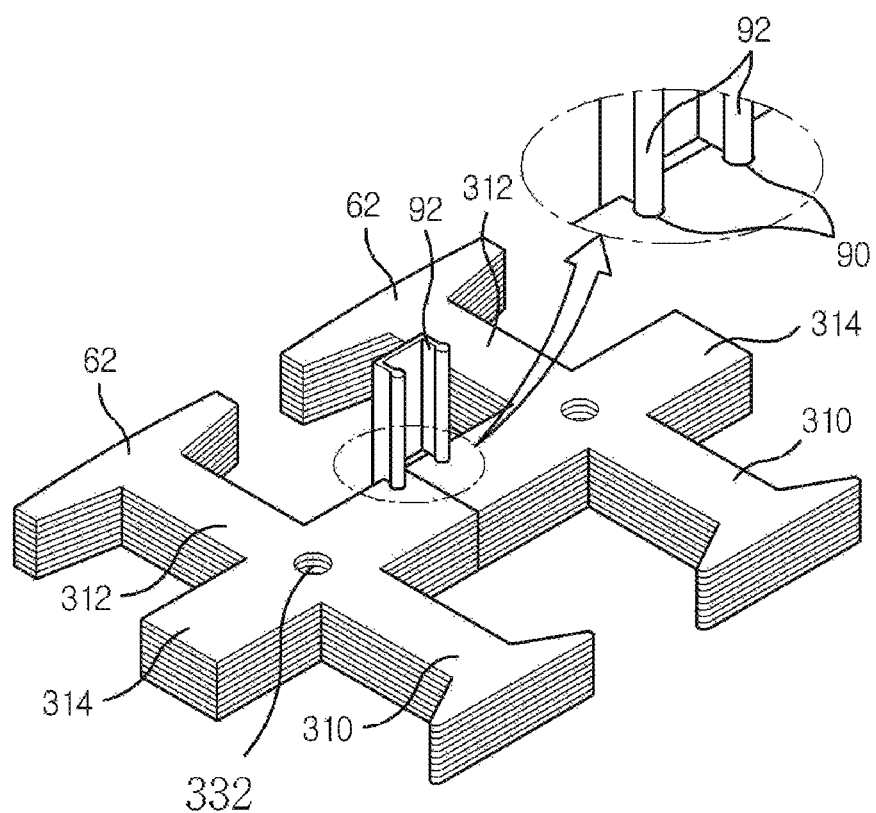
FIGS. 9 and 10 are other examples of a connector of the stator cores according to the present invention.
Figure 10:
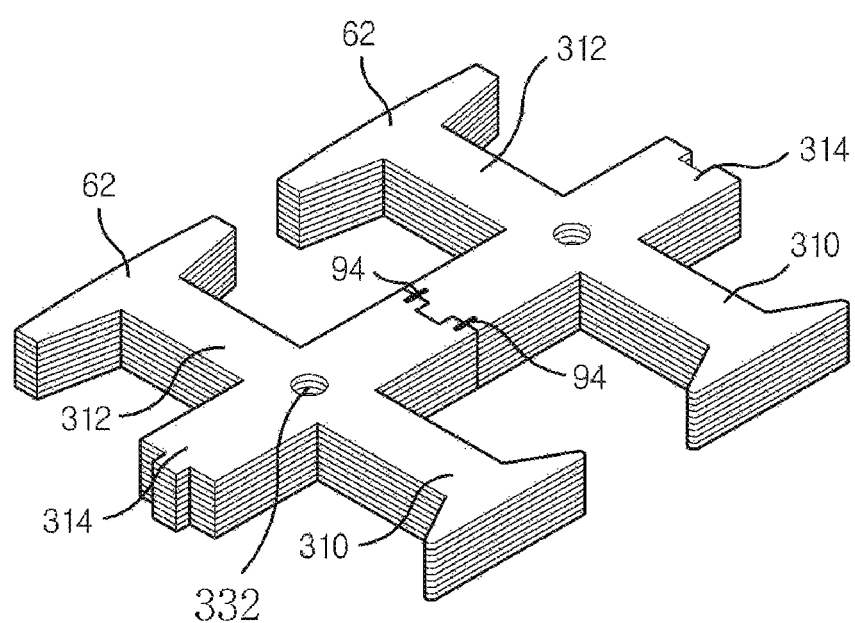

As shown in FIG. 9, in addition to these structures, the coupling portions have a structure that pinholes 90 are form at both end portions of the partitioning portion 314 of each of the stator cores 62, and a pin member 92 is fitted into and coupled with the pinholes 90 of two stator cores 62 at a state where the stator cores 62 contact each other, to thereby employ a structure of connecting between the stator cores 62. As shown in FIG. 10, the coupling portions may employ a method of caulking the stator cores by using a caulking member 94 in a state where the stator cores 62 contact each other.

A bobbin 64 is configured so that a first flange portion 316 and a second flange portion 318 surround the outer circumferential surface of the other stator cores 62 in order to make the first flange portion 316 and the second flange portion 318 of the stator core 62 are exposed to mutually act with a first magnet 44 and a second magnet 54. In other words, the bobbin 64 is formed on the outer circumference of the stator core 62 by insert molding, and insulates between the stator core 62 and both the first coil 66 and the second coil 68.

The driving apparatus of the present invention forms a first magnetic circuit L1 between the inner rotor 40 and one side of the stator 60 where the first coil 66 is wound, and forms a second magnetic circuit L2 between the outer rotor 50 and the other side of the stator 60 where the second coil 68 is wound, to thus form a pair of magnetic circuits each independent to each other. As a result, the inner rotor 40 and the outer rotor 50 can be respectively driven separately.

More specifically, the first magnetic circuit L1 includes a first magnet 44 of an N-pole, a first tooth portion 310 on which the first coil 66 is wound, an inner part of the partitioning portion 314, the first magnet 44 of an S-pole adjacent to the first magnet 44 of the N-pole, and an inner rotor housing 42.

In addition, the second magnetic circuit L2 includes a second magnet 54 of an N-pole, a second tooth portion 312 facing the second magnet 54 of the N-pole and on which the second coil 68 is wound, an outer part of the partitioning portion 314, the second magnet 54 of an S-pole, and an outer rotor housing 52.

Figure 11:
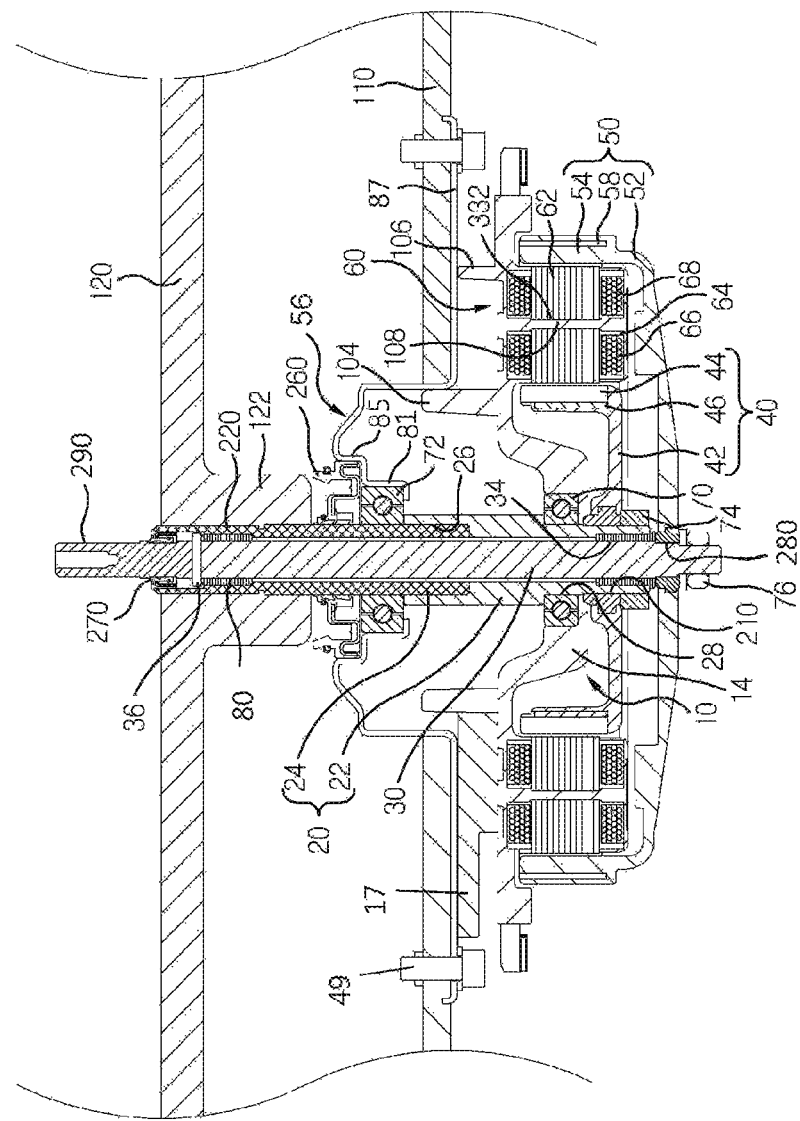
FIG. 11 is a cross-sectional view of a driving apparatus of a washing machine according to a second embodiment of the present invention.
Figure 12:
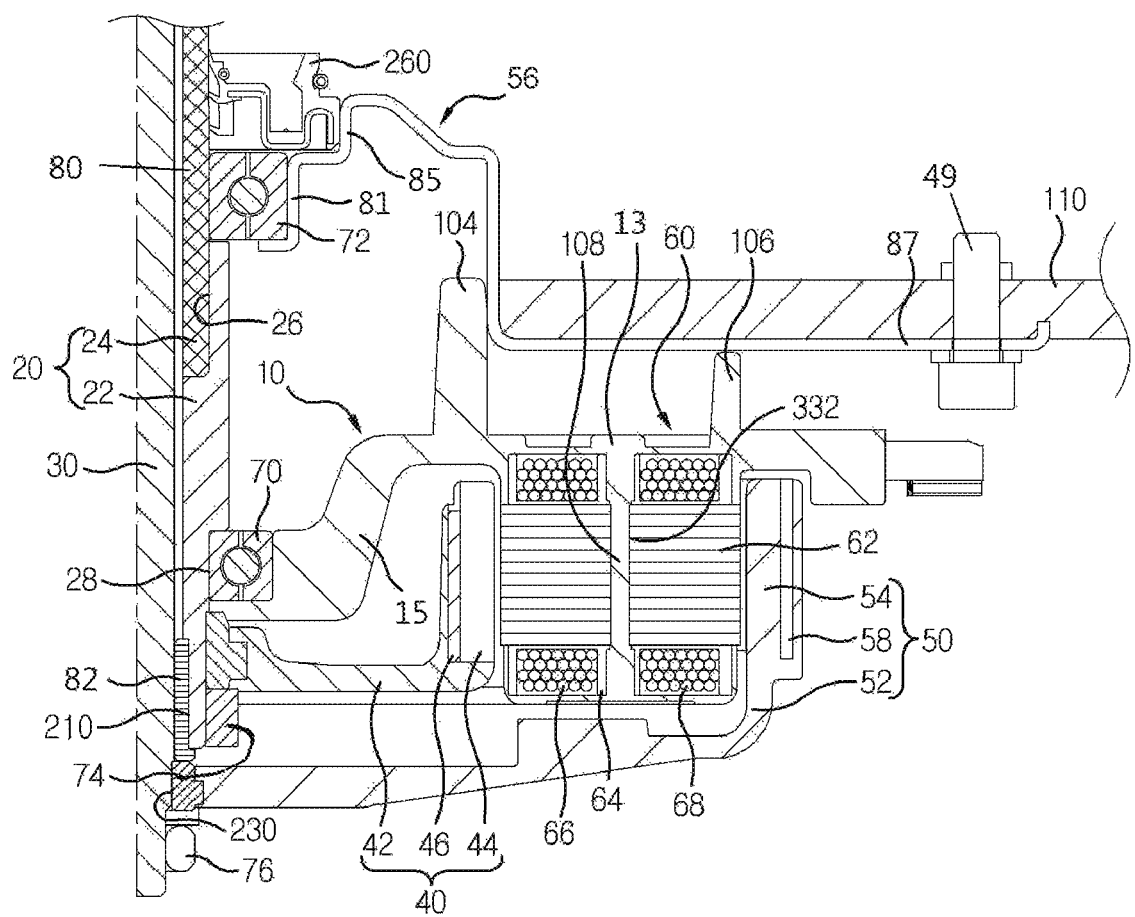
FIG. 12 is a cross-sectional view of half the driving apparatus of the washing machine according to the second embodiment of the present invention.

FIG. 11 is a cross-sectional view of a driving apparatus of a washing machine according to a second embodiment of the present invention, and FIG. 12 is a cross-sectional view of half the driving apparatus of the washing machine according to the second embodiment of the present invention.

The driving apparatus 140 according to the second embodiment includes: an outer shaft 20 which is connected with the washing tub 120; an inner shaft 30 which is rotatably arranged inside the outer shaft 20 and connected with a pulsator 130; an inner rotor 40 which is connected with the outer shaft 20; an outer rotor 50 which is connected to the inner shaft 30; and a stator 60 which is disposed with an air gap between the inner rotor 40 and the outer rotor 50.

A first bearing 70 and a second bearing 72 which rotatably support the outer shaft 20 are disposed at a predetermined interval on an outer circumferential surface of the outer shaft 20.

The first bearing 70 is supported on the first bearing housing 10, and the second bearing 72 is supported on the second bearing housing 56. The first bearing housing 10 and the second bearing housing 56 are fixed to the outer tub 110.

The outer shaft 20 is formed in a cylindrical form so that the inner shaft 30 passes through the outer shaft 20, and includes: a first shaft 22 coupled to the inter rotor 40; and a second shaft 24 connected to an upper side of the first shaft 22 and coupled to the washing tub 120. The structure of the outer shaft 20 according to the second embodiment is identical to that of the outer shaft 20 according to the first embodiment.

The structure of the inner shaft 30 according to the second embodiment is the same as that of the inner shaft 30 that is described according to the second embodiment.

The first bearing housing 10 is configured by arranging the stator cores 62 at a predetermined interval in the circumferential direction in a mold and insert molding the arranged stator cores 62 so as to be integrally formed with the stator cores 62.

In other words, the first bearing housing 10 is molded by an insert molding method, by molding a thermosetting resin, for example, a BMC (Bulk Molding Compound) molding material such as polyester, wherein a plurality of the stator cores 62 are arranged at a predetermined interval in the circumferential direction in a mold and are integrally formed.

Here, the first bearing housing 10 can be integrally molded by insert injection molding the stator cores 62 in a state where a reinforcing material of a metal material is inserted for reinforcement of strength. In this case, an iron material or aluminum material similar to the shape of the first bearing housing 10 may be applied as the reinforcing material of the metal material.

As described above, since the first bearing housing 10 is formed integrally with the stator cores 62, a separate stator support for arranging the stator cores 62 in the circumferential direction is not required, and a process of combining the stator cores 62 with the first bearing housing 10 is unnecessary, to shorten a manufacturing process, to reduce the number of components, and further to reduce a manufacturing cost.

The stator 60 includes: a plurality of stator cores 62 which are radially arranged; bobbins 64 made of a non-magnetic material, and surrounded on the outer circumferential surfaces of the stator cores 62; a first coil 66 wound on one side of the stator cores 62; and a second coil 68 wound on the other side of the stator cores 62.

Each of the stator cores 62 has a throughhole 332 formed at the center thereof, and the throughhole 332 is filled with a molding material when the first bearing housing 10 is insert molded, to thus enhance a coupling force between the stator cores 62 and the first bearing housing 10.

Here, the throughhole 332 may be formed as a long hole that is elongated in the lateral direction so as not to interfere with a flow of a magnetic field. In the case of being integrally formed with the first bearing housing by insert molding, a form having no throughhole 332 can be also applied.

The first bearing housing 10 includes: a stator fixing portion 13 surrounded on the outer surface of the stator cores 62; a bearing supporting portion 15 that extends from the inner surface of the stator fixing portion 13 for supporting the first bearing 70; and a tub fixing portion 17 extending from the outer surface of the bearing support portion 15 and fixed to the outer tub 110.

Then, the first bearing housing 10 further includes: a plurality of first protrusions 104 that are vertically extended from the top surface of the stator fixing portion 13 and that are in contact with the inner surface of the second bearing housing 56; and a plurality of second protrusions 106 that are arranged at regular intervals away from the first protrusion 104, and are in contact with the lower surface of the second bearing housing 56.

The plurality of the first and second protrusions 104 and 106 are formed at predetermined intervals in the circumferential direction on the upper surface of the stator fixing portion 13.

Here, when the first bearing housing 10 integrally formed with the stator cores 62 is assembled with the outer tub 110, the first protrusions 104 are in contact with the inner surface of the second bearing housing 80 to thus align the horizontal position of the first bearing housing 10, and the second protrusions 106 are in contact with the lower surface of the second bearing housing 80 to thus align the vertical position of the first bearing housing 10. Thus, it is possible to conveniently combine the first bearing housing 10 with the outer tub 110, to thus improve the assembling property.

The stator fixing portion 13 enables the seal by surrounding the outer surface of the stator, to thus perform a waterproof function of the stator.

A coupling hole is formed in a tub fixing portion 17, and a bolt 49 is passed through the coupling hole, to then be coupled to the outer tub 110, to thereby enable the first bearing housing 10 to be secured on the outer tub 110.

The second bearing housing 56 is formed of a metal material, and includes: a bearing support portion 81 which is formed in a central opening portion of the second bearing housing 56 to support the second bearing 72; a seal mounting portion 85 which is bent in an upward direction from the bearing support portion 81, in which a first seal 260 is mounted; and an outer tub fixing portion 87 which is bent in a downward direction from the seal mounting portion 85, and which is coupled with the outer tub 110 by the bolt 49.

The first seal 260 is mounted between the upper surface of the second bearing housing 56 and the upper surface of the outer shaft 20 to prevent the wash water from leaking. In addition, a second seal 270 is mounted between the upper inner surface of the outer shaft 20 and the upper outer surface of the inner shaft 30 to prevent the wash water from leaking.

The inner rotor 40 includes: a first magnet 44 which is arranged with a certain gap on the inner surface of the stator 60; a first back yoke 46 which is disposed on the rear surface of the first magnet 44; and an inner rotor housing 42 which is formed integrally with the first magnet 44 and the first back yoke 46 by insert molding.

Here, the inner rotor housing 42 is molded with a BMC (Bulk Molding Compound) molding material such as a thermosetting resin, for example, polyester, and is integrally formed with the first magnet 44 and the first back yoke 46. Therefore, the inner rotor 40 may have a waterproof function, and shorten a manufacturing process.

The inner rotor housing 42 is formed of a disc shape with a central opening portion, in which the inner surface of the inner rotor housing 42 is connected to the first connecting portion 210 of the outer shaft 20 to thus be rotated as the outer shaft 20, and the outer surface of the inner rotor housing 42 is integrally formed with the first magnet 44 and the first back yoke 46.

In addition, the outer rotor 50 includes: a second magnet 54 which is disposed with a predetermined gap on the outer surface of the stator 60; a second back yoke 58 which is disposed on the rear surface of the second magnet 54; and an outer rotor housing 52 which is formed integrally with the second magnet 54 and the second back yoke 58 by insert molding.

Here, the outer rotor housing 52 is molded with a BMC (Bulk Molding Compound) molding material such as a thermosetting resin, for example, polyester, and is integrally formed with the second magnet 54 and the second back yoke 58. Therefore, the outer rotor 50 may have a waterproof function, and shorten a manufacturing process.

The outer rotor housing 52 is formed of a disc shape with a central opening portion, in which the inner surface of the outer rotor housing 52 is connected to the third connecting portion 280 of the inner shaft 30 to thus be rotated as the inner shaft 30, and the outer surface of the outer rotor housing 52 is integrally formed with the second magnet 54 and the second back yoke 58.

The stator 60 of the second embodiment is the same as the stator 60 in the first embodiment in view of the structure described above.

The manufacturing process of the stator according to the present invention will be described on the following.

Figure 13:
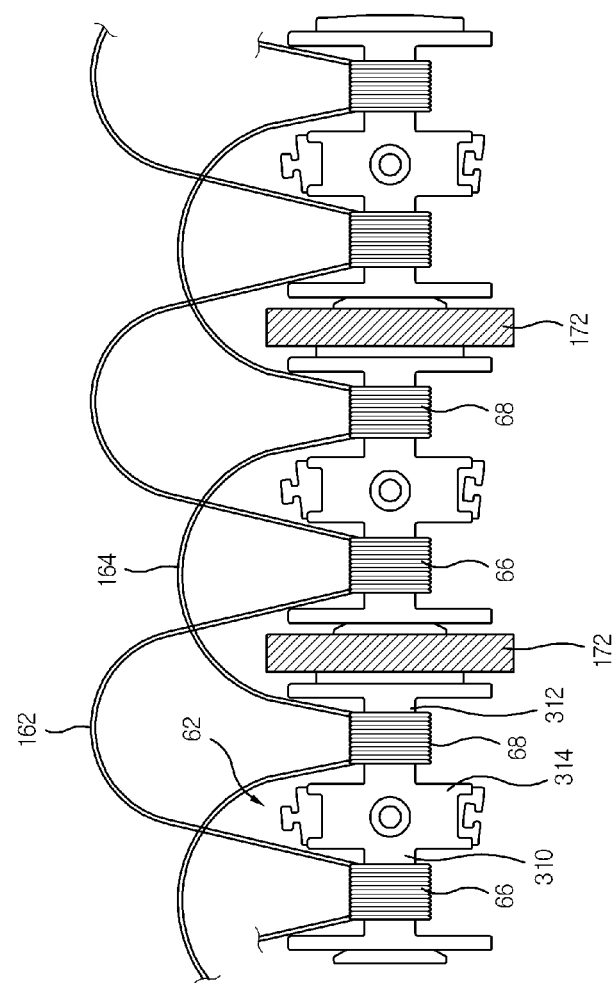
FIG. 13 is a side view showing a process of winding a coil on the stator cores according to the present invention.
Figure 14:
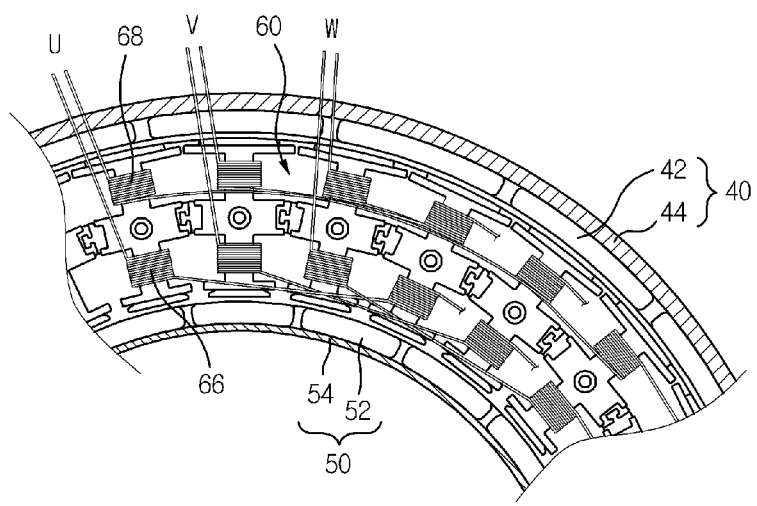
FIG. 14 is a plan view illustrating the stator cores are arranged radially in accordance with the present invention.

FIG. 13 is a side view showing a process of winding a coil on the stator cores according to the present invention, and FIG. 14 is a plan view illustrating the stator cores are arranged radially in accordance with the present invention.

First, each of the stator cores 62 is formed by laminating a plurality of iron plates and then undergoing insert molding so that the bobbin 64 is wrapped around the outer circumferential surface of each of the stator cores 62.

Then, a coil winding process is undergone so that the first coil 66 is wound on the first tooth portion 310 of each of the stator cores 62 and the second coil 68 is wound on the second tooth portion 312 thereof.

Looking at the coil winding process, the stator cores 62 are aligned in a line. In other words, the first tooth portion 310 and the second tooth portions 312 are horizontally aligned in a line, and the stator cores 62 are fixed such that the gaps between the stator cores 62 are horizontally arranged by using a core alignment jig 172. Here, it is preferable to use a magnet jig on both sides of which each of the stator cores 62 is attached as the core alignment jig 172 so that the gaps between the stator cores 62 are secured by using a magnetic force.

When the stator cores 62 are completely aligned, the first coil 66 is wound on the outer circumferential surface of the first tooth portion 310 and simultaneously the second coil 68 is wound on the outer circumferential surface of the second tooth portion 312, by using a continuous winding apparatus. Here, two different coils are each individually on the first tooth portion 310 and the second tooth portion 312, as the first coil 66 and the second coil 68, respectively.

Here, each of the stator cores 62 is partitioned into the first tooth portion 310 and the second tooth portion 312, by a partitioning portion 314, and thus the first coil 66 wound on the first tooth portion 310 and the second coil 68 wound on the second tooth portion 312 may be wound in a separated form from each other.

In addition, when the windings of one stator core 62 are completed, the windings of a neighboring stator core 62 are performed subsequently one after another in a continuous coil winding method. That is, the first coil 66 is wound on the outer circumferential surface of the first tooth portion 310 of each of the stator cores 62 and simultaneously the second coil 68 is wound on the outer circumferential surface of the second tooth portion 312 thereof. Here, since a clearance is somewhat secured between the stator cores 62 when the stator cores 62 are aligned radially, a first jump wire 162 is connected between one first coil 66 and a neighboring first coil 66, and a second jump wire 164 is connected between one second coil 68 and a neighboring second coil 68.

Coils are continuously wound on the plurality of the stator cores 62, by repeating the above process. In the case of a three-phase system, three sets of core assemblies corresponding to each of U, V, and W phases are assembled.

As described above, since the second coil 68 is simultaneously wound on the outer circumferential surface of the second tooth portion 312 of each of the stator cores 62 when the first coil 66 is wound on the outer circumferential surface of the first tooth portion 310 thereof, in the case of the coil winding method according to the present embodiment, the first coil 66 and the second coil 68 are simultaneously wound, to thereby improve productivity and shorten a manufacturing time.

When the manufacture of the core assembly is completed, in the above manufacturing process as shown in FIG. 10, split type cores of the respective U, V, and W phases are alternately arranged in turn for each phase. In this case, since the jump wires 162 and 164 are connected between the stator cores 62, the gaps which may be formed between the core assemblies when the three-phase core assemblies are alternately arranged can be counter-measured sufficiently.

The plurality of the core assemblies are radially arranged and then are coupled with the first bearing housing 10 with a bolt 330, to thereby complete assembly of the stator.

Here, the bolt 330 passes through throughholes 332 formed in the stator cores 62 and is coupled to the coupling hole 14 of the first bearing housing 10, to thereby simplify the assembly process. Then, after the stator cores 62 are radially arranged in a mold, it is possible to form the first bearing housing 10 into one body by insert injection.

The operation of the driving apparatus of the washing machine according to the embodiments of the present invention will be described on the following.

First, when power is supplied to the second coil 68, in order to drive only the pulsator 130 during washing, the outer rotor 50 is rotated and the inner shaft 30 which is connected to the outer rotor 50 is rotated, to accordingly rotate the pulsator 130.

In addition, when the power is simultaneously applied to the first coil 66 and the second coil 68, in order to rotate both the pulsator 130 and the dehydrating tub 120 during dehydrating and rinsing, the inner rotor 40 is rotated and the outer shaft 20 which is connected to the inner rotor 40 is rotated, by the magnetic circuit L1, to accordingly rotate the washing tub 120. Simultaneously, the outer rotor 50 is rotated and the inner shaft 30 which is connected to the outer rotor 50 is rotated, by the magnetic circuit L2, to accordingly rotate the pulsator 130.

Then, when the pulsator 130 and the washing tub 120 are rotated in opposite directions, in order to perform the release stroke or remove an entanglement of the laundry 130, power is applied to the first coil 66 and the second coil 68 in the opposite directions to each other. Then, the inner rotor 40 and the outer rotor 50 are rotated in the opposite directions to each other, and the pulsator 130 and the washing tub 120 are also rotated in the opposite directions to each other.

It has been described in the above-described embodiments that a larger number of the split type stator cores which are divided for respective slots and are mutually bonded may be used as the stator, but it is of course possible to form respective split type stator cores to have a partial split type structure having a plurality of slots or to form the stator core as a one-piece core not the split type.

As described above, the present invention has been described with respect to particularly preferred embodiments. However, the present invention is not limited to the above embodiments, and it is possible for one of ordinary skill in the art to make various modifications and variations, without departing off the spirit of the present invention. Thus, the protective scope of the present invention is not defined within the detailed description thereof but is defined by the claims to be described later and the technical spirit of the present invention.

The present invention relates to a washing machine driving apparatus and a washing machine comprising same in which a washing tub and a pulsator are directly connected to the washing machine driving apparatus, to thus drive the washing tub and the pulsator, respectively, without having a separate intermediate mediator. A motor used for the washing machine driving apparatus is of a double rotor and double stator type, in which an inner rotor and an outer rotor are connected to a pulsator and a washing tub of the washing machine, respectively, to thus drive the pulsator and the washing tub independently and form a variety of washing water flows.

What is claimed is:

1. A washing machine driving apparatus comprising:
   an outer shaft which is connected with a washing tub, the washing tub being disposed inside an outer tub;
   an inner shaft which is rotatably arranged inside the outer shaft and connected with a pulsator;
   an inner rotor which is connected with the outer shaft;
   an outer rotor which is connected to the inner shaft; and
   a stator which is disposed with an air gap between the inner rotor and the outer rotor,
   wherein the outer shaft has one end connected to the washing tub and the other end connected to the inner rotor and is directly connected between the washing tub and the inner rotor, and
   wherein the inner shaft has one end connected to the pulsator and the other end connected to the outer rotor and is directly connected between the pulsator and the outer rotor,
   wherein the outer shaft is rotatably supported by a first bearing and a second bearing, in which the first bearing is fixed to a first bearing housing, the second bearing is fixed to a second bearing housing, and the first bearing housing and the second bearing housing are fixed to the outer tub,
   wherein the first bearing housing includes: a stator fixing portion surrounding an outer surface of stator cores; a bearing supporting portion that extends from an inner surface of the stator fixing portion for supporting the first bearing; and an outer tub fixing portion extending from an outer surface of the bearing supporting portion and fixed to the outer tub, and wherein the first bearing housing further includes: a plurality of first protrusions that are vertically extended from a top surface of the stator fixing portion and that are in contact with an inner surface of the second bearing housing; and a plurality of second protrusions that are arranged at regular intervals away from the plurality of first protrusions, and are in contact with a lower surface of the second bearing housing.

2. The washing machine driving apparatus of claim 1, wherein the outer shaft is formed of a hollow shape, and comprises: a first shaft on an outer circumferential surface of which a first connecting portion connected to an inner rotor housing is formed; and a second shaft which is press-fixed to an upper end of the first shaft and on an outer circumferential surface of which a second connecting portion connected to the washing tub is formed.

3. The washing machine driving apparatus of claim 2, wherein the first shaft comprises: a press-fit groove into which the second shaft is press-fitted and which is formed inside of an upper end of the first shaft; and a stepped portion which is formed on an outer circumferential surface of a lower side of the first shaft, in which the first connecting portion by which the first bearing is supported and to which an inner rotor housing is connected are formed on the stepped portion, and a first fixing nut which secures the inner rotor housing is engaged with the stepped portion.

4. The washing machine driving apparatus of claim 1, wherein each of the stator cores has a throughhole formed at a center thereof, and a fixing bolt is engaged with a first coupling hole formed in the first bearing housing through the throughhole.

5. The washing machine driving apparatus of claim 1, wherein the first bearing housing is integrally formed with the stator by an insert injection molding.

6. The washing machine driving apparatus of claim 1, wherein a reinforcing member of a metallic material is inserted into inside of the first bearing housing.

7. The washing machine driving apparatus of claim 1, wherein the inner rotor comprises:
- a first magnet which is disposed with a certain gap on an inner surface of the stator;
- a first back yoke which is disposed on a rear surface of the first magnet; and
- an inner rotor housing which is integrally formed with the first magnet and the first back yoke by insert molding and connected to the outer shaft.

8. The washing machine driving apparatus of claim 1, wherein the outer rotor comprises:
- a second magnet which is disposed with a certain gap on an outer surface of the stator;
- a second back yoke which is disposed on a rear surface of the second magnet; and
- an outer rotor housing which is integrally formed with the second magnet and the second back yoke by insert molding and connected to the inner shaft.

* * * * *